(12) United States Patent
Yan et al.

(10) Patent No.: US 11,531,203 B2
(45) Date of Patent: Dec. 20, 2022

(54) NEAR-TO-EYE DISPLAY METHOD AND APPARATUS AND WEARABLE DEVICE

(71) Applicant: BOE Technology Group Co., Ltd., Beijing (CN)

(72) Inventors: Meng Yan, Beijing (CN); Wei Wang, Beijing (CN); Qiuyu Ling, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/328,629

(22) Filed: May 24, 2021

(65) Prior Publication Data

US 2021/0405371 A1  Dec. 30, 2021

(30) Foreign Application Priority Data

Jun. 30, 2020  (CN) .......................... 202010612219.2

(51) Int. Cl.
*G02B 27/01* (2006.01)
*G06T 7/33* (2017.01)
*G02B 7/02* (2021.01)

(52) U.S. Cl.
CPC ......... *G02B 27/0172* (2013.01); *G02B 7/023* (2013.01); *G06T 7/33* (2017.01)

(58) Field of Classification Search
CPC ...... G02B 27/0172; G02B 27/023; G06T 7/33
USPC ..................................... 345/7; 348/49, 222.1
See application file for complete search history.

(56) References Cited

U.S. PATENT DOCUMENTS

| | | | |
|---|---|---|---|
| 2012/0104478 A1* | 5/2012 | Masuoka | H01L 31/035281 257/E31.127 |
| 2013/0335533 A1* | 12/2013 | Yamazaki | H01L 27/14627 348/49 |
| 2014/0078333 A1* | 3/2014 | Miao | H04N 5/2251 348/222.1 |
| 2015/0022691 A1* | 1/2015 | Matsunaga | H04N 5/36961 348/246 |
| 2017/0102583 A1* | 4/2017 | Ito | G02B 3/0018 |
| 2020/0035837 A1* | 1/2020 | Ahmed | H01L 29/78696 |

* cited by examiner

*Primary Examiner* — Prabodh M Dharia
(74) *Attorney, Agent, or Firm* — Workman Nydegger

(57) ABSTRACT

A near-to-eye display apparatus includes a plurality of pixel island groups. Each pixel island group includes a plurality of pixel islands. Each pixel island corresponds to a micro lens. By adjusting a position of the micro lens relative to the corresponding pixel island in the pixel island group, on a plane where the micro lenses are located, or a position, of the pixel island in the pixel island group relative to the corresponding micro lens, on a plane where the pixel islands are located, imaging points in the imaging regions formed by at least part of different pixel islands in the pixel island groups do not overlap with each other and are arranged alternately.

15 Claims, 11 Drawing Sheets

NEAR-TO-EYE DISPLAY METHOD AND APPARATUS AND WEARABLE DEVICE

CROSS REFERENCE TO RELATED APPLICATIONS

The present disclosure claims priority to Chinese Patent Application No. 202010612219.2 filed with the China National Intellectual Property Administration on Jun. 30, 2020, the entire contents of which are incorporated herein by its reference.

FIELD

The present disclosure relates to the field of display technology, in particular to a near-to-eye display method and apparatus and a wearable device.

BACKGROUND

Along with rapid development of a near-to-eye display technology, virtue reality (VR), augmented reality (AR) and mixed reality (MR) increasingly become important ways for human to obtain information, and also become new manners for people to interact with the world.

SUMMARY

Embodiments of the present disclosure provide a near-to-eye display method and apparatus and a wearable device.

In a first aspect, an embodiment of the present disclosure provides a near-to-eye display method including a plurality of pixel island groups, wherein the respective pixel island groups are provided with respective imaging regions at an imaging position, all the imaging regions are not overlapped with each other, each of the imaging regions corresponds to a part of region of a complete image needing imaging, all the imaging regions are jointly and seamlessly spliced into the complete image, each of the pixel island groups includes a plurality of pixel islands, the pixel islands corresponds to micro lenses one to one, and each of the pixel islands includes a plurality of pixels arranged in an array; wherein the method includes:

adjusting a position of the micro lens relative to the corresponding pixel island in the pixel island group, on a plane where the micro lenses are located, or a position, of the pixel island in the pixel island group relative to the corresponding micro lens, on a plane where the pixel islands are located, so that imaging points in the imaging regions formed by at least part of different pixel islands in the pixel island groups do not overlap with each other and are arranged alternately.

In some embodiments, the method further includes:

determining an imaging angle range of each of the pixel islands in each of the pixel island groups, wherein each of the pixel island groups includes a main pixel island and at least one auxiliary pixel island, a spacing between the two adjacent imaging points corresponding to the two adjacent pixels in each main pixel island is equally divided by a plurality of imaging points, one of the plurality of imaging points corresponds to one pixel in one of the at least one auxiliary pixel island, the one pixel in one of the at least one auxiliary pixel island and one pixel in the two adjacent pixels in the main pixel island are located at a same position in their respective pixel islands, and display regions corresponding to all the main pixel islands are spliced together to constitute the complete image; and determining coordinates of a position of one of the pixel island and the corresponding micro lens by taking a position of a center point of the other one of the pixel island and the corresponding micro lens as a reference point according to the imaging angle range, a distance between the pixel island and the micro lens in a first direction and a focal length of the micro lens; wherein the first direction is perpendicular to the plane where the pixel islands are located or the plane where the micro lenses are located.

In some embodiments, the determining the coordinates of the position of the one includes:

constructing a coordinate system with the reference point as a coordinate origin, wherein a coordinate axis passing through the coordinate origin in the first direction is an abscissa axis of the coordinate system, a coordinate axis passing through the coordinate origin in a second direction is an ordinate axis of the coordinate system, the second direction is parallel to a connecting line for connecting center points of every two adjacent pixel island groups, and the first direction is perpendicular to the second direction; and determining an ordinate of the position of the one in the second direction according to the imaging angle range and the distance, wherein the distance is an abscissa of the position of the one in the first direction.

In some embodiments, in the condition that the distance is equal to the focal length of the micro lens, the determining the ordinate of the position of the one in the second direction includes:

determining the ordinate by a formula:

$$y1 = f \times (\tan \beta_1 + \tan \beta_2)/2, \text{ wherein}$$

y1 is an ordinate of the center point of the micro lens, f is the focal length, $\beta_1$ is an emergence angle of a light ray, which has passed through the micro lens, emitted from one farthest pixel in the corresponding pixel island, $\beta_2$ is an emergence angle of a light ray, which has passed through the micro lens, emitted from the other farthest pixel in the corresponding pixel island, a direction linearly extending from the pixel corresponding to $\beta_2$ to the pixel corresponding to $\beta_1$ through the coordinate origin is the same as the second direction, and $\beta_2$ is smaller than $\beta_1$.

In some embodiments, no gap exists between the two adjacent pixel island groups; or a gap exists between the two adjacent pixel island groups, and the gap is filled with transparent materials.

In some embodiments, each of the pixel island groups includes a plurality of sub pixel island groups, each of the sub pixel island groups includes three pixel islands emitting different lights, and in the three pixel islands, imaging points corresponding to pixels at the same position in the imaging regions are completely coincided.

In some embodiments, the three pixel islands are arranged in an L shape, a linear shape or a delta shape.

In some embodiments, the pixel islands are each in a shape of any one of a regular triangle, a square and a regular hexagon.

In a second aspect, an embodiment of the present disclosure provides a near-to-eye display apparatus, including:

a plurality of pixel island groups; wherein the respective pixel island groups are provided with respective imaging regions at an imaging position, all the imaging regions are not overlapped, each of the imaging regions corresponds to a part of region of a complete image needing imaging, all the imaging regions are jointly and seamlessly spliced into the complete image, each of the pixel island groups includes a plurality of pixel islands, and each of the pixel islands includes a plurality of pixels arranged in an array; and micro lenses, corresponding to the pixel islands one to one;

wherein a position of the micro lens relative to the corresponding pixel island in the pixel island group, on a plane where the micro lenses are located, or a position, of the pixel island in the pixel island group relative to the corresponding micro lens, on a plane where the pixel islands are located is adjusted so that imaging points in the imaging regions formed by at least part of different pixel islands in the pixel island groups do not overlap with each other and are arranged alternately.

In some embodiments, each of the pixel island groups includes a main pixel island and at least one auxiliary pixel island, a spacing between the two adjacent imaging points corresponding to the two adjacent pixels in each main pixel island is equally divided by a plurality of imaging points, one of the plurality of imaging points corresponds to one pixel in one of the at least one auxiliary pixel island, the one pixel in one of the at least one auxiliary pixel island and one pixel in the two adjacent pixels in the main pixel island are at a same position in their respective pixel islands, and display regions corresponding to all the main pixel islands are spliced together to constitute the complete image; and determining coordinates of a position of one of the pixel island and the corresponding micro lens by taking a position of a center point of the other one of the pixel island and the corresponding micro lens as a reference point according to an imaging angle range of the pixel island, a distance between the pixel island and the micro lens in a first direction and a focal length of the micro lens; wherein the first direction is perpendicular to the plane where the pixel islands are located or the plane where the micro lenses are located.

In some embodiments, an ordinate, of the position of the one, in a second direction is determined according to the imaging angle range and the distance, and the distance is an abscissa of the position of the one in the first direction;

wherein a coordinate axis passing through a coordinate origin in the first direction is an abscissa axis of a coordinate system with the reference point as the coordinate origin, a coordinate axis passing through the coordinate origin in a second direction is an ordinate axis of the coordinate system, the second direction is parallel to a connecting line for connecting center points of two adjacent pixel island groups, and the first direction is perpendicular to the second direction.

In some embodiments, in the condition that the distance is equal to the focal length of the micro lens, the ordinate of the position of the one in the second direction is determined by a formula:

$$y1 = f \times (\tan \beta_1 + \tan \beta_2)/2, \text{ wherein}$$

y1 is an ordinate of the center point of the micro lens, f is the focal length, $\beta_1$ is an emergence angle of a light ray, which has passed through the micro lens, emitted from one farthest pixel in the corresponding pixel island, $\beta_2$ is an emergence angle of a light ray, which has passed through the micro lens, emitted from the other farthest pixel in the corresponding pixel island, a direction linearly extending from the pixel corresponding to $\beta_2$ to the pixel corresponding to $\beta_1$ through the coordinate origin is the same as the second direction, and $\beta_2$ is smaller than $\beta_1$.

In some embodiments, no gap exists between the two adjacent pixel island groups; or a gap exists between the two adjacent pixel island groups, and the gap is filled with a transparent material.

In some embodiments, each of the pixel island groups includes a plurality of sub pixel island groups, each of the sub pixel island groups includes three pixel islands emitting different lights, and in the three pixel islands, imaging points corresponding to pixels at the same position in the imaging regions are completely coincided.

In some embodiments, the three pixel islands are arranged in an L shape, a linear shape or a delta shape.

In some embodiments, the pixel islands are each in a shape of any one of a regular triangle, a square and a regular hexagon.

In a third aspect, an embodiment of the present disclosure provides a wearable device, including the near-to-eye display apparatus in the second aspect.

DETAILED DESCRIPTION OF THE EMBODIMENTS

Figure 1:
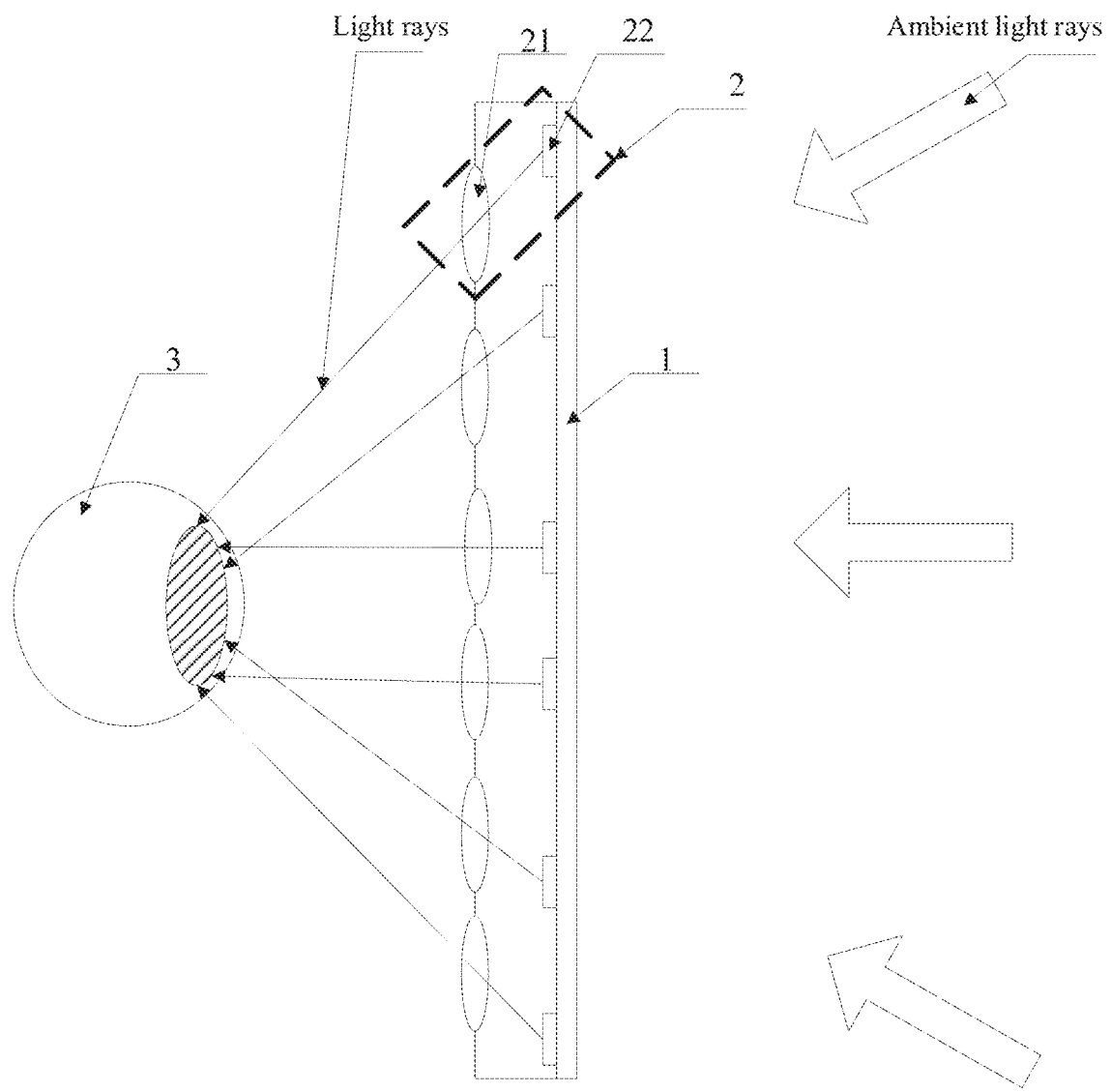
FIG. 1 is a schematic structural diagram of a near-to-eye display apparatus constituted by a plurality of pixel islands-micro lenses in the related art.

Embodiments of the present disclosure provide a near-to-eye display method and apparatus and a wearable device, which are configured to increase an angle resolution while keeping an eye display device to be light and thin.

In order to make the above objects, features and advantages of the present disclosure more obvious and understandable, the present disclosure will be further explained with reference to the drawings and embodiments. However, the example implementations may be implemented in many forms and should not be construed as limited to the implementations set forth herein; and on the contrary, these implementations are provided to make the present disclosure more thorough and complete, and to fully convey the concept of the example implementations to those skilled in the art. In the drawings, the same drawing reference numerals denote the same or similar structures, and thus repeated descriptions thereof will be omitted. The words expressing position and direction described in the present disclosure are all illustrated with the drawings as an example, but they can also be changed as needed, and all the changes are included in the protection scope of the present disclosure. The drawings of the present disclosure are only configured to illustrate the positional relationship and do not represent the true scale.

It should be noted that in the following description, specific details are set forth in order to fully understand the present disclosure. However, the present disclosure can be implemented in many other ways different from those described here, and those skilled in the art can make similar popularization without violating the connotation of the present disclosure. Therefore, the present disclosure is not limited by the specific implementations disclosed below. The following description of the specification is a preferred implementation for implementing the present application, but the description is for the purpose of explaining the general principles of the present application, and is not intended to limit the scope of the present application. The protection scope of the present application shall be as defined by the appended claims.

Images can be directly projected into eyes of watchers through a near-to-eye display device such as VR glasses and a VR helmet so as to realize an immersed display experience.

In a head-mounted display device, refined high-resolution display can bring stronger immersion to a user and reduce dizziness and visual fatigue. An angle resolution of VR display can be increased by improving pixel per inch (PPI) of a display panel and increasing a distance between a lens and the display panel. However, in this way, the overall cost and thickness of the device will be increased, which is not suitable for long-time wearing of the user.

In view of this, a technical problem needing to be solved urgently is how to increase the angle resolution while keeping an eye display device to be light and thin.

FIG. 1 is a schematic structural diagram of a near-to-eye display apparatus constituted by a plurality of pixel islands-micro lenses in the related art. The near-to-eye display apparatus includes a plurality of micro lenses 21 on one side of a transparent substrate 1 and a plurality of pixel islands 22 between the substrate 1 and the plurality of micro lenses 21, where each of the pixel islands 22 is equivalent to a small display screen. The micro lenses 21 correspond to the pixel islands 22 one by one, that may be marked as a pixel island-micro lens 2, and light rays emitted by the pixel islands 22 pass through the corresponding micro lenses 21 and then enter human eyes 3, so that the human eyes 3 see display images. In addition, a spacing exists between the pixel islands 22, a spacing also exists between the micro lenses 21, outside ambient light may enter the human eyes 3 from the spacing between the pixel islands 22 and the spacing between the micro lenses 21, so that the human eyes 3 see the display images of the pixel islands 22 and an outside object at the same time to realize augmented reality display.

Figure 2:
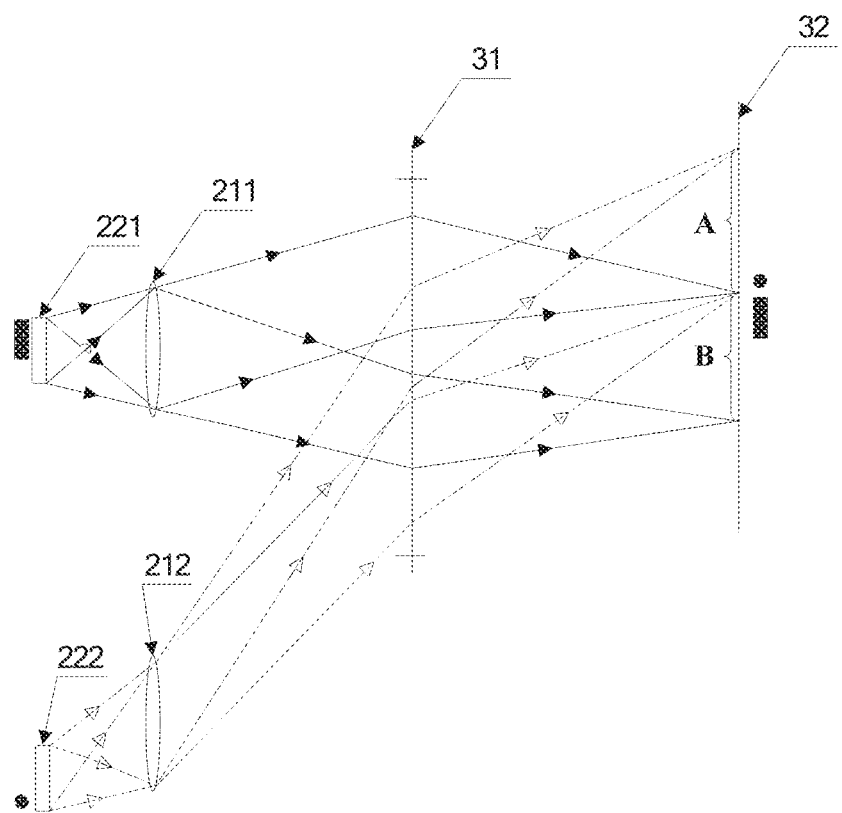
FIG. 2 is a principle diagram of splicing display images of different pixel islands in the related art.

Imaging regions formed in the human eyes by each pixel island in the near-to-eye display apparatus are different. Please refer to FIG. 2, which is a principle diagram of splicing display images of the different pixel islands in the related art. In FIG. 2, a light beam emitted by each pixel of the pixel islands is refracted by the corresponding micro lens to form a beam of parallel light to be emitted to a crystalline lens and then converged on a retina. As for the human eyes, two beams of parallel light which have certain widths and the same angle will be converged on the same imaging point on the retina after entering the human eyes, and parallel light incident from different angles will be converged on the different imaging points on the retina. Therefore, the images displayed by the different pixel islands can be spliced on the retina by reasonably controlling the angle of the light rays incident to the crystalline lens.

It should be noted that FIG. 2 only illustratively indicates the splicing display principle of the two pixel islands, and in actual application, splicing display may be performed by more pixel islands. In order to show a light path diagram of the two pixel islands and the emitted light rays more clearly, in FIG. 2, the light rays emitted from the two pixel islands are shown in a full line and a dotted line respectively. As shown in FIG. 2, the pixel island 221 displays a part of an inverted letter "i", and the pixel island 222 displays the other part of the inverted letter "i".

In FIG. 2, the light rays emitted by the pixel island 221 pass through a micro lens 211 and the crystalline lens 31 and then fall in a B region of the retina 32, and the light rays emitted by the pixel island 222 pass through a micro lens 212 and the crystalline lens 31 and then fall in an A region of the retina 32, so that an upright "i" pattern is spliced on the retina 32.

In the near-to-eye display apparatus, refined high-resolution display can bring stronger immersion to a user and reduce dizziness and visual fatigue. After the distance between the pixels in the pixel islands reaches a limit which may be realized technologically, increasing of a resolution of the near-to-eye display apparatus by improving density of the pixels in the pixel islands will become difficult.

The near-to-eye display method provided by the embodiment of the present disclosure is explained below with reference to drawings.

Figure 3:
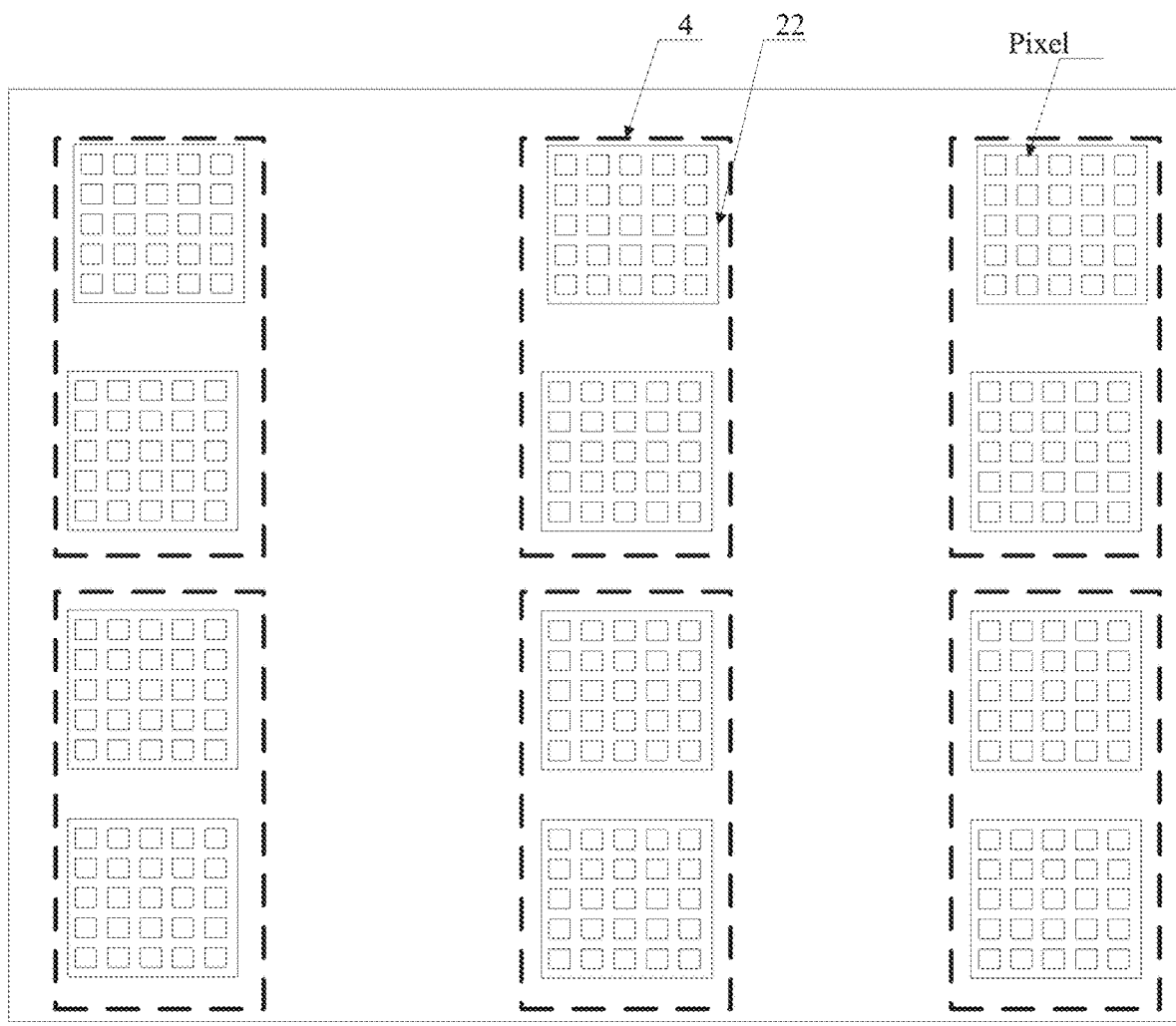
FIG. 3 is a schematic structural diagram of a near-to-eye display apparatus provided by an embodiment of the present disclosure.
Figure 4:
FIG. 4 is a schematic diagram of imaging regions corresponding to all pixel stands in FIG. 3 provided by an embodiment of the present disclosure.

Please refer to FIG. 3 which is a schematic structural diagram of the near-to-eye display apparatus provided by the embodiment of the present disclosure. The near-to-eye display apparatus includes a plurality of pixel island groups 4. Each pixel island group 4 has an imaging region at an imaging position, all the imaging regions are not overlapped with each other, one imaging region corresponds to a part of region of a complete image needing imaging, and all the imaging regions are jointly and seamlessly spliced into the complete image. Please refer to FIG. 4 which is a schematic diagram of the imaging regions corresponding to all the pixel islands in FIG. 3 provided by the embodiment of the present disclosure, and a small block in FIG. 4 corresponds to the imaging region of the pixel island group 4.

It should be noted that FIG. 3 only indicates the situation that each pixel island group 4 includes the two pixel islands 22. In actual application, each pixel island group 4 may further be composed of three or more pixel islands 22, which is not limited here. In FIG. 3, the near-to-eye display apparatus includes only six pixel island groups 4, which may be freely set in actual application according to the needs and not limited here.

Figure 5:
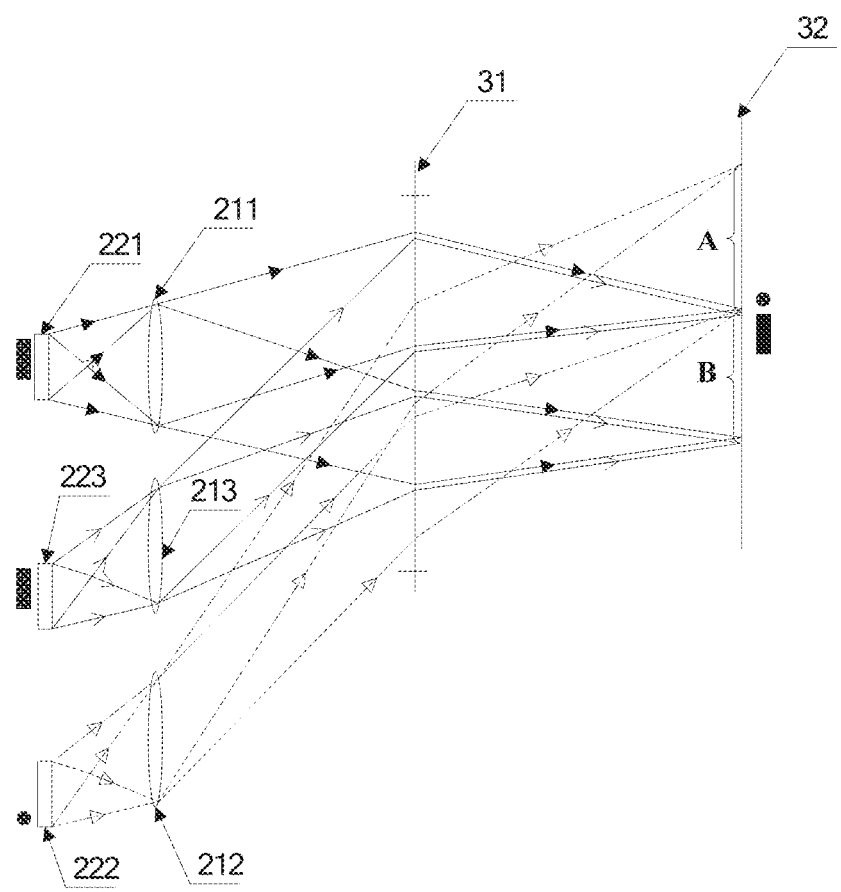
FIG. 5 is a principle diagram of display images of pixel island groups provided by an embodiment of the present disclosure.

The pixel island group 4 includes the plurality of pixel islands 22, each pixel island 22 corresponds to one micro lens 21, and the pixel island 22 includes a plurality of pixels arranged in an array. Please refer to FIG. 5 which is a principle diagram of display images of the pixel island groups provided by the embodiment of the present disclosure. In FIG. 5, the pixel island group 4 including the pixel island 221 and the pixel island 223 display a lower half part of the inverted letter "i", and the pixel island 222 displays the upper half part of the inverted letter "i".

In FIG. 5, the light rays emitted by the pixel island group 4 pass through the micro lens 211, the micro lens 213 and the crystalline lens 31 and then fall in the B region of the retina 32, and the light rays emitted by the pixel island 222 pass through the micro lens 212 and the crystalline lens 31 and then fall in the A region of the retina. 32, so that an upright "i" pattern is spliced on the retina 32.

Figure 6:
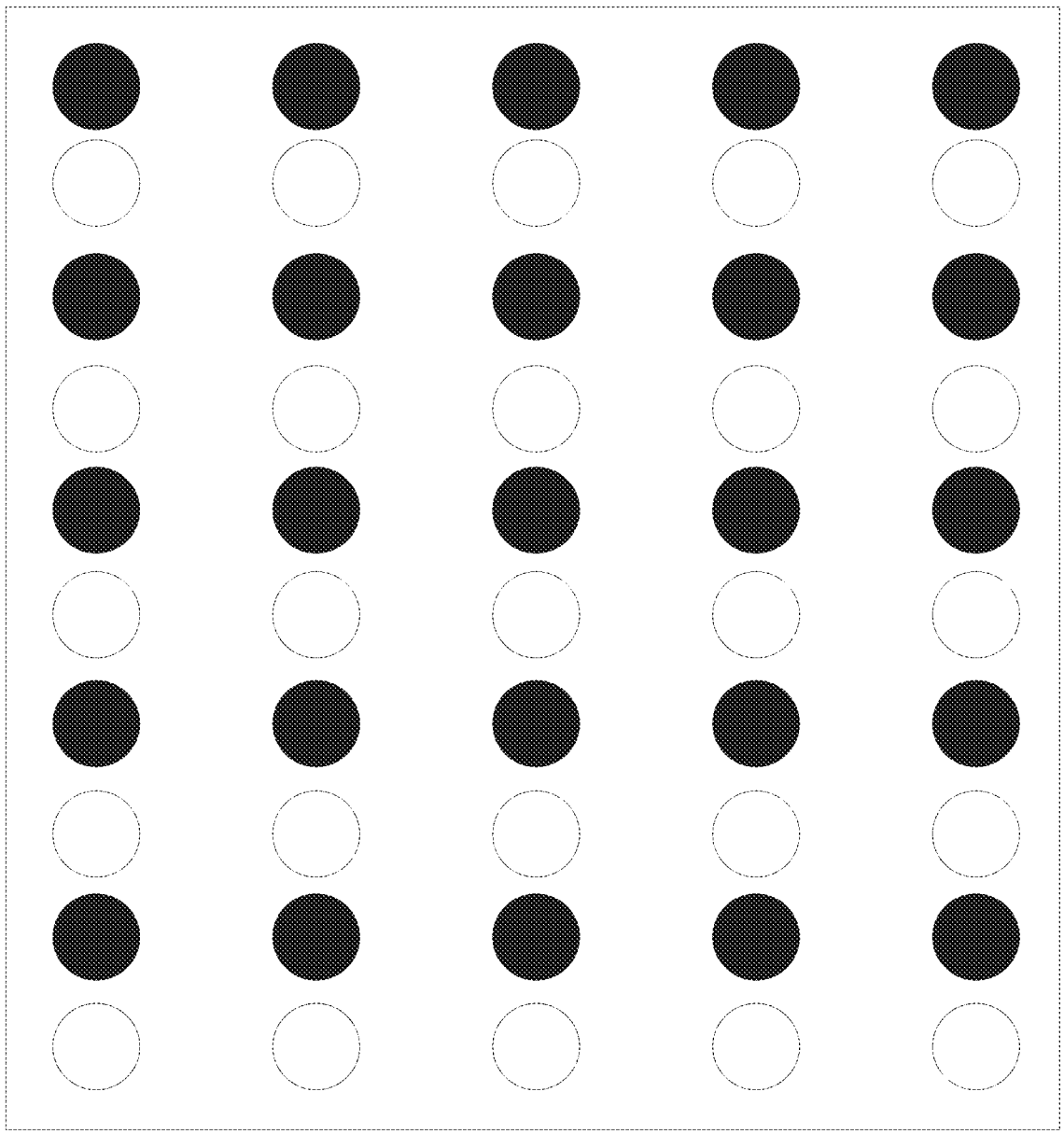
FIG. 6 is a schematic diagram of imaging point arrangement in imaging regions corresponding to the pixel island groups in FIG. 5 provided by an embodiment of the present disclosure.

By adjusting a position, of the micro lens 211 relative to the corresponding pixel island 221 in the pixel island group 4, on a plane where the micro lenses are located, or a position, of the pixel island 221 in the pixel island group 4 relative to the corresponding micro lens 211, on a plane where the pixel islands are located, imaging points formed in the imaging regions by at least part of different pixel islands 22 in the pixel island group 4 do not overlap with each other and are arranged alternately. Please refer to FIG. 6 which is a schematic diagram of imaging point arrangement in the imaging regions corresponding to the pixel island groups in FIG. 5 provided by the embodiment of the present disclosure. In FIG. 6, black solid circles indicate the corresponding positions of the imaging points, of the pixels of the pixel island 221 in the pixel island group 4, in the imaging regions, and white solid circles indicate the corresponding positions of the imaging points, of the pixels of the pixel island 223, in the imaging regions. It is shown in FIG. 6 that the pixel island 221 and the pixel island 223 correspond to one imaging region, and their corresponding imaging points are arranged alternately.

In the embodiment provided by the present application, by adjusting the position, of the micro lens relative to the corresponding pixel island in the pixel island group, on a plane where the micro lenses are located, or the position, of the pixel island in the pixel island group relative to the corresponding micro lens, on a plane where the pixel islands are located, the imaging points formed in the imaging regions by at least part of different pixel islands in the pixel island groups do not overlap with each other and are arranged alternately, therefore, display granular sensation can be reduced and an angle resolution of the emergent light rays of the pixel island groups can be increased under the condition of not changing the distance, between each pixel island and the corresponding micro lens, in a first direction, the definition of images watched by the human eyes is increased, and the objective that the resolution of a near-to-eye display device can still be increased under existing technological limits is achieved. The first direction is perpendicular to the plane where the pixel islands or the micro lenses located.

In addition, it may be observed in combination with FIG. 5 that the images displayed by using the pixel island groups 4 in the present application are clearer (for example, the part of "i" as shown in the B region), but the images not displayed by using the pixel island groups 4 in the present application are low in definition (for example, the part of "i" as shown in the A region).

In the embodiment provided by the present application, the step of adjusting the position, of the micro lens relative to the corresponding pixel island in the pixel island group, on the plane where the micro lenses are located, or the position, of the pixel island in the pixel island group relative to the corresponding micro lens, on the plane where the pixel islands are located may be implemented by adopting the following modes.

An imaging angle range of each pixel island in the pixel island groups is determined firstly, where each pixel island group includes a main pixel island and at least one auxiliary pixel island, a spacing between the two adjacent imaging points corresponding to the two adjacent pixels in each main pixel island is equally divided by a plurality of imaging points, one of the plurality of imaging points corresponds to one pixel in one of the auxiliary pixel islands, one pixel in the auxiliary pixel islands and one pixel in the two adjacent pixels in the main pixel islands are located at the same position in their respective pixel islands, and display regions corresponding to all the main pixel islands are spliced together to constitute one complete image.

Then, coordinates of the position of one of the pixel island and the corresponding micro lens is determined by taking a position of a center point of the other one of the pixel island and the corresponding micro lens as a reference point according to the imaging angle range, a distance between the pixel island and the micro lens in the first direction and a focal length of each micro lens.

Figure 7:
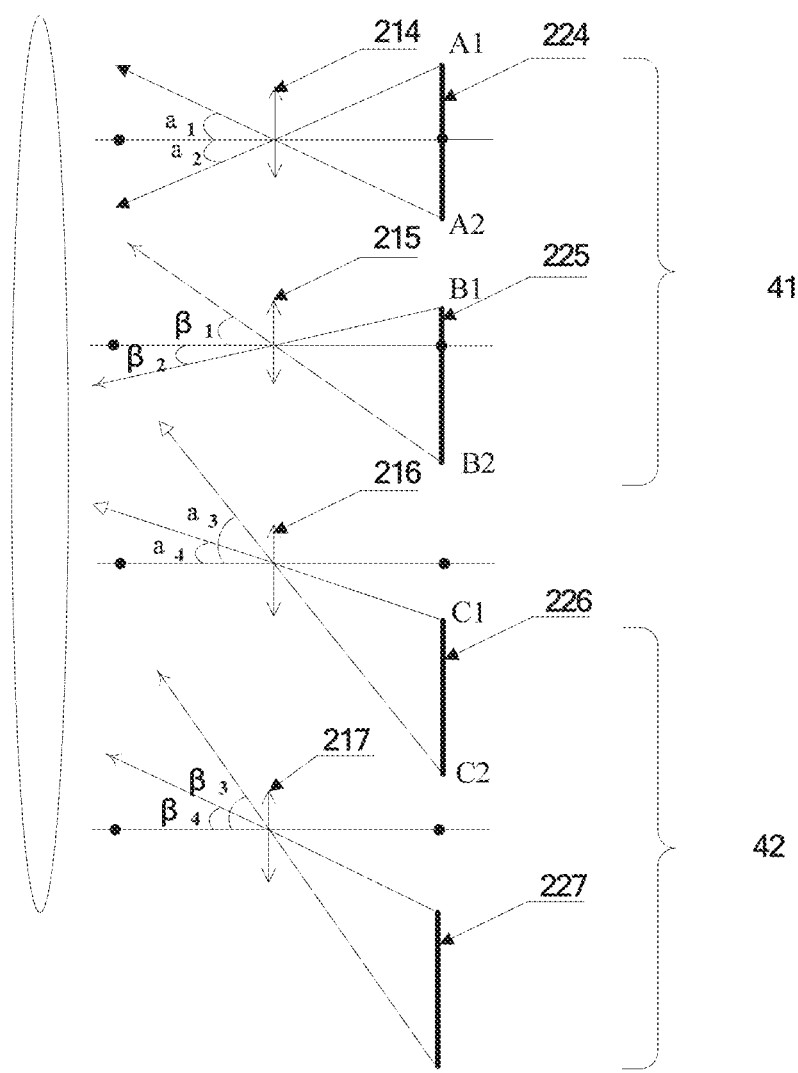
FIG. 7 is a schematic diagram for adjusting a position, of a micro lens relative to a corresponding pixel island in a pixel island group, on a plane where micro lenses are located, or a position, of a pixel island in a pixel island group relative to a corresponding micro lens, on a plane where pixel islands are located provided by an embodiment of the present disclosure.

Please refer to FIG. 7 which is a schematic diagram for adjusting the position, of the micro lens relative to the corresponding pixel island in the pixel island group, on the plane where the micro lenses are located, or the position, of the pixel island in the pixel island group relative to the corresponding micro lens, on the plane where the pixel islands are located provided by the embodiment of the present disclosure.

FIG. 7 indicates the two adjacent pixel island groups 41 and 42. The pixel island group 41 includes a main pixel island 224 and an auxiliary pixel island 225, and the pixel island group 42 includes a main pixel island 226 and an auxiliary pixel island 227. An imaging angle range of emergent light rays of the main pixel island 224 through the micro lens 214 is $\alpha_2$ to $\alpha_1$, an imaging angle range of emergent light rays of the auxiliary pixel island 225 through the micro lens 215 is $\beta_2$ to $\beta_1$, an imaging angle range of emergent light rays of the main pixel island 226 through the corresponding micro lens 216 is $\alpha_4$ to $\alpha_3$, and an imaging angle range of emergent light rays of the auxiliary pixel island 227 through the corresponding micro lens 217 is $\beta_4$ to $\beta_3$.

Due to the fact that in the near-to-eye display apparatus, the display regions corresponding to all the main pixel islands are spliced together to constitute one complete image, an imaging angle range (for example, 0 to θ) needing to be reached by the near-to-eye display apparatus is determined during design. It is assumed that the near-to-eye display apparatus (as shown in FIG. 3) includes 2 (row)×3 (column) of the main pixel islands, where the pixel islands on the upper portion in each pixel island group are the main pixel islands, and the pixel islands on the lower portion are the auxiliary pixel islands.

Then in FIG. 3, an imaging angle length (namely the difference between a maximum value and a minimum value of the imaging angle range of the main pixel islands) of each main pixel island in the row direction is θ/3, and an imaging angle length of each main pixel island in the column direction is θ/2, in FIG. 3, a value range of the main pixel islands at the upper left corner in the column direction is 0 to θ/2, and an imaging angle range of the main pixel islands at the lower left corner is θ/2 to θ. Because the imaging angle length of each main pixel island in the row direction is θ/3, by taking the main pixel islands in the first row as an example in FIG. 3, an imaging angle range of the main pixel islands at the upper left corner in the row direction is 0 to θ/3, an imaging angle range of the main pixel islands in the middle is θ/3 to 2θ/3, and an imaging angle range of the main pixel islands at the upper right corner is θ/2 to θ. The value range of other main pixel islands can be done in the same manner.

Because the auxiliary pixel islands and the main pixel islands are the same in structure (that is, the pixel arrangement, display colors and images are the same), the lengths of the imaging angle ranges of the auxiliary pixel islands in the column direction and the row direction are the same as that of the main pixel islands in the column direction and the row direction, respectively. Because the spacing between the two adjacent imaging points corresponding to the two adjacent pixels in the main pixel island are equally divided by the imaging points corresponding to the pixels at the same position in all the corresponding auxiliary pixel islands with one pixel of the two adjacent pixels in the main pixel island, the same position means the position corresponding to one pixel in the auxiliary pixel island and the position corresponding to one pixel in the two adjacent pixels in the main pixel island, and thus emergence angles of a row of pixels corresponding to a column of imaging points at the imaging points are same in size.

As shown in FIG. 3 in the column direction, the angle resolution of the near-to-eye display apparatus is θ/20 (in FIG. 3, one pixel island is composed of 5×5 pixels, and a column totally contains 4×5 pixels), and in one pixel island group in FIG. 3, the imaging angle range of the auxiliary pixel islands is equivalent to deviation by one angle resolution on the basis of the imaging angle range of the corresponding main pixel islands. By taking the pixel island group 4 at the upper right corner as an example, because the imaging angle range of the main pixel islands (it is assumed to be the pixel islands 22 in the first row in the pixel island group) is 0 to θ/2, the imaging angle range of the corresponding auxiliary pixel islands (it is assumed to be the pixel islands 22 in the second row in the pixel island group) is θ/20 to θ/2+θ/20, and the imaging angle range of other auxiliary pixel islands can be deduced in the same manner.

It should be noted that the display regions corresponding to all the main pixel islands in the near-to-eye display apparatus are not overlapped as well. FIG. 3 only shows the situation that one pixel island group includes one main pixel island and one auxiliary pixel island. Actually, one pixel island group may include one main pixel island and the plurality of auxiliary pixel islands.

Figure 8:
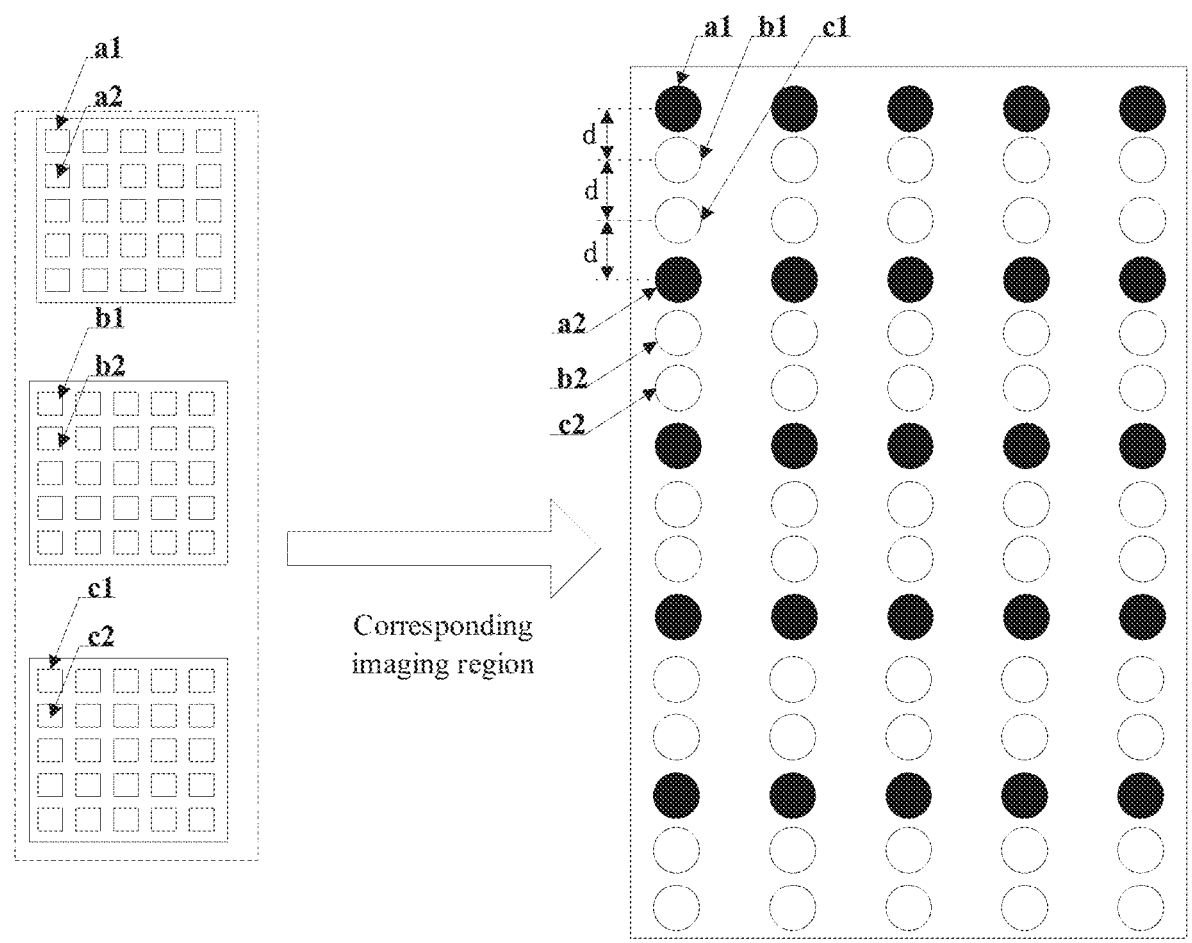
FIG. 8 is a schematic diagram for calculating an imaging angle range of auxiliary pixel islands when a pixel island group includes a main pixel island and the plurality of auxiliary pixel islands provided by an embodiment of the present disclosure.

Please refer to FIG. 8 which is schematic diagram for calculating the imaging angle range of the auxiliary pixel islands when the pixel island group includes one main pixel island and the plurality of auxiliary pixel islands provided by the embodiment of the present disclosure.

In FIG. 8, the pixel island in the first row in the pixel island group is the main pixel island, and the other two pixel islands in the pixel island group are the auxiliary pixel islands. The pixels b1 and c1 respectively located in the two auxiliary pixel islands are at the same position with the pixel a1 in the main pixel island. In order to facilitate the understanding, the imaging points corresponding to the pixels in the main pixel island in the imaging regions are indicated through black solid circles, and the imaging points corresponding to the pixels in the auxiliary pixel islands are indicated through white solid circles. It may be observed from FIG. 8 that the spacing between the two imaging points a1 and a2 corresponding to the two adjacent pixels (the pixel a1 and the pixel a2) in the main pixel island are equally divided by the imaging point b1 and the imaging point c1 respectively corresponding to the pixel b1 and the pixel c1, at the same position with the pixel a1, in the two auxiliary pixel islands (the spacings between the imaging points are each d). The imaging points corresponding to other pixels are similar and not repeated here.

It should be understood that although FIG. 8 only indicates the situation that one pixel island group includes one main pixel island and the two auxiliary pixel islands, in actual application, one main pixel island may further include more auxiliary pixel islands, and the auxiliary pixel islands may be between any other main pixel island adjacent to the main pixel island, which is not illustrated with examples one by one here.

In the embodiment provided by the present disclosure, the imaging angle range of each pixel island in the pixel island groups may further be determined by the angle resolution and the number of the pixels in the pixel islands.

Still by taking the example in FIG. 3 as an example, in the column direction of FIG. 3, the angle resolution of the near-to-eye display apparatus is θ/20, the pixel island group at the upper left corner totally has ten pixels in one column, therefore, the imaging angle range of the main pixel island in the column direction is 0 to 10×θ/20 (namely, 0 to θ/2) and the imaging angle range of the corresponding auxiliary pixel islands in the column direction is θ/20 to θ/2+θ/20.

After the imaging angle range of each pixel island in the pixel island groups is calculated, coordinates of the position of one of the pixel island and the corresponding micro lens may be determined by taking the position of the center point of the other one of the pixel island and the corresponding micro lens as the reference point according to the imaging angle range, a distance between the pixel island and the micro lens in the first direction and the focal length of each micro lens.

Please continue to refer to FIG. 7. It is assumed that the positions of all the pixel islands in FIG. 7 are determined, the positions of the corresponding micro lenses may be determined only by taking the center points of the pixel islands as the reference points according to the imaging angle range of the pixel islands and the distance between the pixel islands and the corresponding micro lenses, and vice versa.

Figure 9:
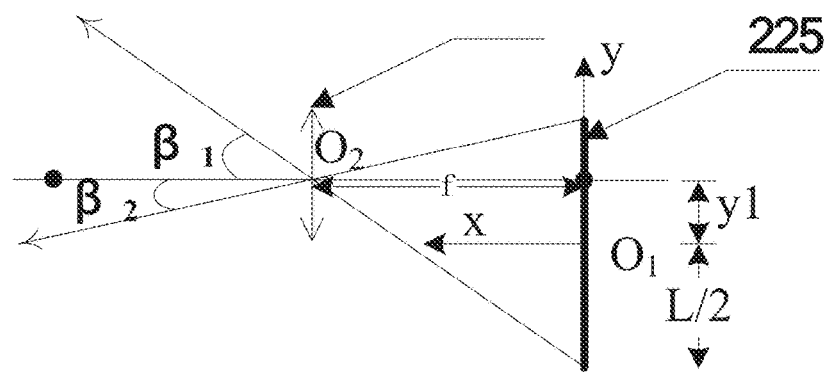
FIG. 9 is a schematic diagram for determining coordinates of a position of a micro lenses 214 in FIG. 7 provided by an embodiment of the present disclosure.

Please refer to FIG. 9 which is a schematic diagram for determining the coordinates of the position of the micro lens 214 in FIG. 7 provided by the embodiment of the present disclosure. Because the position of the pixel island 225 is determined and the distances, which is assumed to be the focal length f of the micro lenses in the example, between all the pixel islands and all the micro lenses in the first direction are also determined, by taking the center point of the pixel island 225 as a coordinate origin, the coordinates of the position of the one, which is taken the micro lens 215 as an example, is determined by the following modes.

A coordinate system with the reference point $O_1$ as the coordinate origin is constructed, where a coordinate axis passing through the coordinate origin in a first direction x is an abscissa axis of the coordinate system, a coordinate axis passing through the coordinate origin in a second direction y is an ordinate axis of the coordinate system, the first direction x is perpendicular to a plane where the pixel islands are located, the second direction y is parallel to a connecting line for connecting the center points (not shown in the figure) of the two adjacent pixel island groups, and the first direction x is perpendicular to the second direction y.

An ordinate (marked as y1) of the one (the micro lens 215) in the second direction y is determined according to the imaging angle range ($\beta_2$ to $\beta_1$) of the pixel island 225 and the distance f, where the distance f is an abscissa of the one (the micro lens 215) in the first direction x. It is assumed that the length of the pixel island 225 in the second direction is L, then:

$$\tan \beta_1 = (y1 + L/2)/f \quad (1);$$

$$\tan \beta_2 = (L/2 - y1)/f \quad (2).$$

Wherein, $y1 = f \times (\tan \beta_1 + \tan \beta_2)/2$ may be calculated according to formulas (1) and (2). That is to say, the coordinates of the micro lens 215 relative to the center of the pixel island 225 is (f,y1).

In a similar way, the position of other micro lenses may also be determined by adopting the mentioned mode. If the position of the micro lenses is known, the position of the corresponding pixel islands needing to be determined may also be done in the same manner.

Therefore, when the distance is equal to the focal length of the micro lens, a value of the ordinate of the micro lenses is determined by adopting a formula:

$$y1 = f \times (\tan \beta_1 + \tan \beta_2)/2.$$

Wherein, y1 is an ordinate of a center point of the micro lens, f is the focal length, $\beta_1$ is an emergence angle of a light ray, which has passed through the micro lens, emitted from one farthest pixel in the corresponding pixel island, $\beta_2$ is an emergence angle of a light ray, which has passed through the micro lens, emitted from the other farthest pixel in the corresponding pixel island, a direction linearly extending from the pixel corresponding to $\beta_2$ to the pixel corresponding to $\beta_1$ through the coordinate origin is the same as the second direction, and $\beta_2$ is smaller than $\beta_1$.

When the distance between the micro lens and the pixel island in the first direction is smaller than the focal length, a distance between the micro lenses and the pixel islands in the first direction may also be determined by adopting a similar method, which is not repeated one by one here.

It may be observed from FIG. 7 that the imaging angle ranges of the two adjacent main pixel islands (no other main pixel island exists between this two main pixel islands) are complementary with each other. That is to say, an upper limit value of the imaging angle range of one main pixel island is equal to a lower limit value of the imaging angle range of the other adjacent main pixel island, a lower limit value of the imaging angle range of the auxiliary pixel island corresponding to the main pixel island is within the imaging angle range of the main pixel island, and an upper limit value of the imaging angle range of the auxiliary pixel island corresponding to the main pixel island is within the imaging angle range of the other adjacent main pixel island.

That is to say, in FIG. 7, a relationship between the upper limit value as well as the lower limit value of the imaging angle range of the auxiliary pixel island 225 and the upper limit value as well as the lower limit value of the imaging angle range of the main pixel island 224 and the main pixel island 226 meets the following conditions:

$$\alpha_2 < \beta_2 < \alpha_1 < \beta_1 < \alpha_3, \alpha_1 = \alpha_4 \quad (3).$$

If the main pixel island 224 includes more auxiliary pixel islands, the upper limit values and the lower limit values of the imaging angle range of the auxiliary pixel islands still meet the relationship shown in the formula (3).

With FIG. 7 as an example, before using the solution, the near-to-eye display apparatus constituted by the main pixel island and the corresponding micro lens in FIG. 7 is used in the prior art, and its angle resolution is: $\theta = \text{actan}(m/f)$. After using the solution, the angle resolution of the near-to-eye display apparatus shown in FIG. 7 is increased to $\theta' = \text{actan}(0.5 \, m/f)$, where m is the distance between the two adjacent pixels in the pixel island, and f is the local length of the micro lens. Obviously, after using the solution, $\theta' = 0.5\theta$, after using the resolution is doubled.

This shows that when one main pixel island corresponds to several auxiliary pixel islands in the pixel island group, accordingly, the resolution of the imaging region corresponding to the pixel island group may be several times higher than the resolution of imaging by only using the main pixel island. If the situation as shown in FIG. 3 that the pixel island group includes one main pixel island and one auxiliary pixel island is used, the resolution is doubled compared with the resolution only using one main pixel island. If the situation as shown in FIG. 7 that the pixel island group includes one main pixel island and two auxiliary pixel islands is used, the resolution is increased by two times compared with the resolution only using one main pixel island. Other situations may be done in the same manner and are not repeated here.

In the embodiment provided by the present disclosure, a gap may not exist between the two adjacent pixel island groups.

Figure 10:
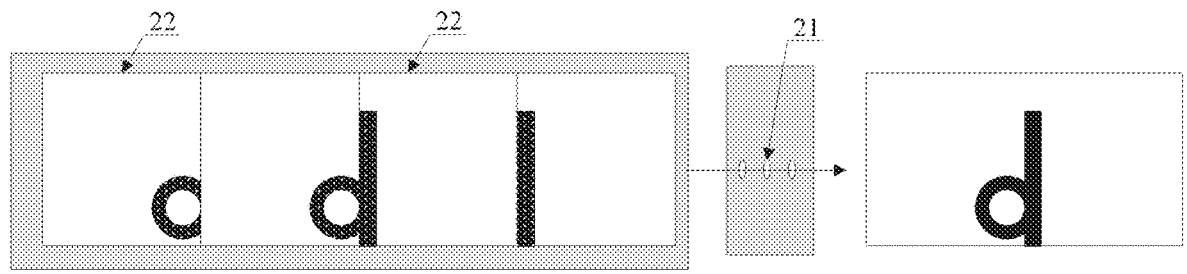
FIG. 10 is a schematic diagram of a first pixel island group arrangement and a corresponding imaging region provided by an embodiment of the present disclosure.

As shown in FIG. 10 which is a schematic diagram of a first pixel island group arrangement and a corresponding imaging region provided by the embodiment of the present disclosure, one pixel island group displays the left half part of a letter "d", the other pixel island group displays the right half part of the letter "d", each of the pixel island groups is composed of one main pixel island and one auxiliary pixel island, and all the pixels are the same type of pixels, for example, each pixel emits one color (such as any color of RUB (red-green-blue), and each pixel island displays the same color component in the R, G and B) or is in full color (that is, one pixel is composed of three sub pixels R, G and B, and each pixel island correspondingly displays the full-color images).

The pixel island groups are arranged in a seamless sealed-connection. An area of a pixel panel may be fully utilized, the pixel islands are closely connected without gaps, and each pixel island is matched with the corresponding micro lens for imaging, thereby realizing resolution superposed increasing on the image surface.

In the embodiment provided by the present disclosure, the gap may also exist between the two adjacent pixel island groups, and the gap is filled with transparent materials.

Figure 11:
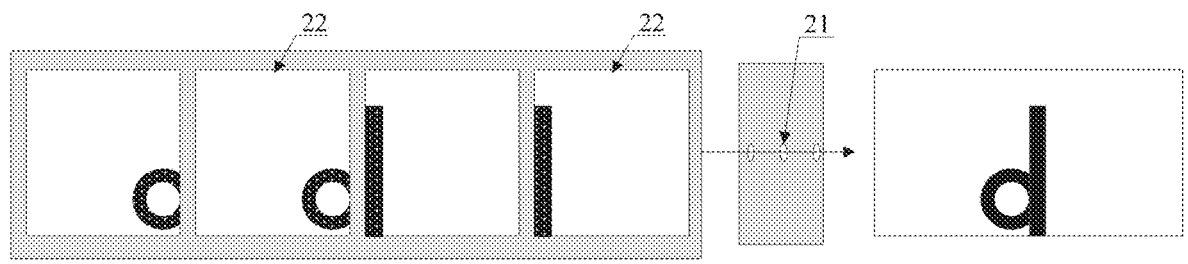
FIG. 11 is a schematic diagram of a second pixel island group arrangement and a corresponding imaging region provided by an embodiment of the present disclosure.

As shown in FIG. 11, FIG. 11 is a schematic diagram of a second pixel island group arrangement and a corresponding imaging region provided by the embodiment of the present disclosure. In FIG. 11, constitution of the pixel island groups is similar to that in FIG. 10, the difference lies in that the spacing exists among the pixel island groups and among the pixel islands, and the spacing is filled with the transparent materials. Gaps among the pixel island groups and among the pixel islands are transparent when a transparent substrate (such as glass) is adopted, thus outside objects can be seen, and the augmented reality effect is achieved by separating the pixel island groups, and separating the pixel islands as well as reserving the gaps.

In the embodiment provided by the present disclosure, each pixel island group includes a plurality of sub pixel island groups, each sub pixel island group includes three pixel islands emitting different lights, and in the three pixel islands, the imaging points corresponding to the pixels at the same position in the imaging regions are completely coincided.

Figure 12:
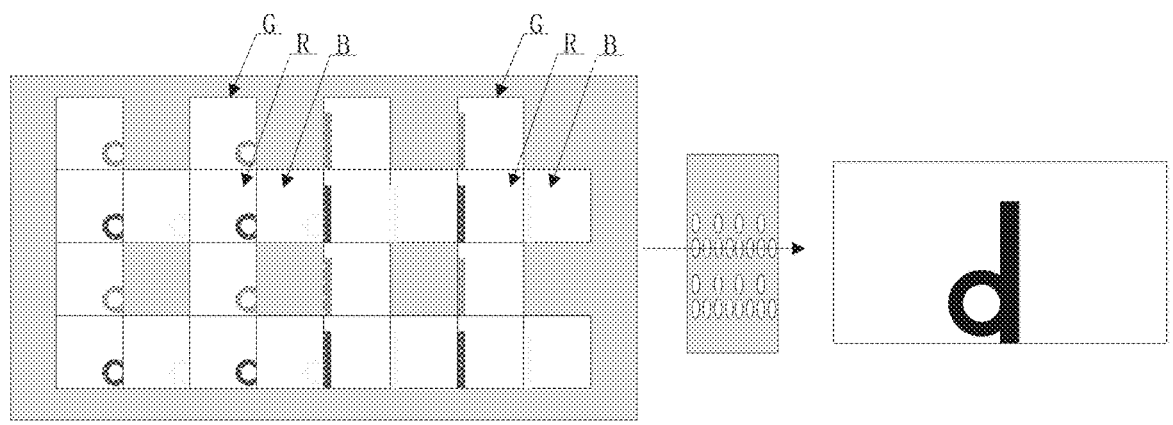
FIG. 12 is a schematic diagram of a third pixel island group arrangement and a corresponding imaging region provided by an embodiment of the present disclosure.
Figure 13:
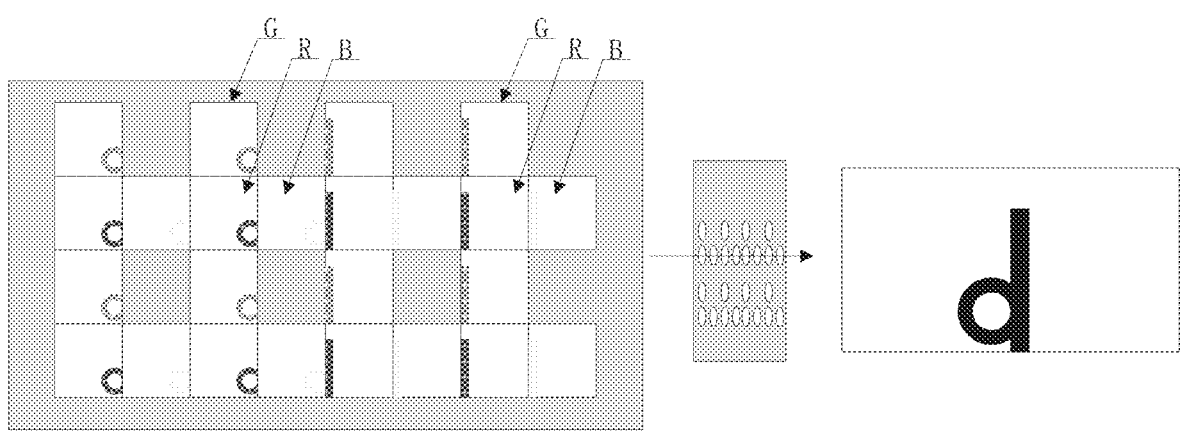
FIG. 13 is a schematic diagram of a fourth pixel island group arrangement and a corresponding imaging region provided by an embodiment of the present disclosure.

Please refer to FIG. 12 and FIG. 13, FIG. 12 is a schematic diagram of a third pixel island group arrangement and the corresponding imaging region provided by the embodiment of the present disclosure, and FIG. 13 is a schematic diagram of a fourth pixel island group arrangement and the corresponding imaging region provided by the embodiment of the present disclosure. In FIG. 12 and FIG. 13, one pixel island group is constituted by four sub pixel island groups, one of the sub pixel island groups is the main sub pixel island group and composed of three main pixel islands R (red), G (green) and B (blue), and each sub pixel island group in the rest three sub pixel island groups is composed of three auxiliary pixel islands R (red), G (green) and B (blue). The R main pixel island corresponds to the three R auxiliary pixel islands, the G main pixel island corresponds to the three G auxiliary pixel islands, and the B main pixel island corresponds to the three B auxiliary pixel islands. The three pixel islands in each sub pixel island group correspond to the same region at the imaging position, in these three pixel islands, the imaging points corresponding to the pixels at the same position in the imaging regions are completely coincided, and in this way, the full-color images are displayed in the imaging regions.

In FIG. 12 and FIG. 13, the R, G and B colors are mixed through the sub pixel island groups, and thus the images are displayed in a full-color. The auxiliary pixel islands are arranged for each corresponding main pixel island in the pixel island group, thus the imaging points of the auxiliary pixel islands are inserted between the adjacent imaging points of the main pixel island at the imaging position, and the resolution of the display region can be increased. As shown in FIG. 12, the seamless arrangement is adopted between the pixel island groups and between the pixel islands, and the utilization rate of a pixel panel can be increased. However, as shown in FIG. 13, the pixel island groups are arranged at intervals and the pixel islands are arranged at intervals, the spacing between them is filled with the transparent materials, and the transparent substrate is adopted, so the AR display effect can be achieved, and augmented reality display is achieved.

In the embodiment provided by the present disclosure, the three pixel islands in each sub pixel island group may be arranged in an L shape, a linear shape or a delta shape.

In the embodiment provided by the present disclosure, the pixel islands may be each in a shape of one of a regular triangle, a square and a regular hexagon.

Based on the same inventive concept, an embodiment of the present disclosure provides a near-to-eye display apparatus, which uses the near-to-eye display method in the present disclosure for display. In some embodiments, the structure of the near-to-eye display apparatus may refer to the structure provided in the near-to-eye display method, which is not repeated here.

Based on the same inventive concept, an embodiment of the present disclosure provides a wearable device, and the wearable device includes the near-to-eye display apparatus as mentioned above.

The wearable device may be VR glasses, a VR helmet, AR glasses, an AR helmet. MR glasses, an MR helmet, and so on.

Although the preferred embodiments of the present disclosure have been described, those skilled in the art can make additional modifications and variations on the embodiments once they know the basic creative concept. Therefore, the appended claim intends to be explained as including the preferred embodiments and all modifications and variations falling within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A near-to-eye display method, applied to a near-to-eye display apparatus comprising a plurality of pixel island groups, wherein the respective pixel island groups are provided with respective imaging regions at an imaging position, all the imaging regions are not overlapped with each other, each of the imaging regions corresponds to a part of region of a complete image needing imaging, all the imaging regions are jointly and seamlessly spliced into the complete image, each of the pixel island groups comprises a plurality of pixel islands, the pixel islands corresponds to micro lenses one to one, and each of the pixel islands comprises a plurality of pixels arranged in an array; wherein the method comprises:

adjusting a position of the micro lens relative to the corresponding pixel island in the pixel island group, on a plane where the micro lenses are located, or a position, of the pixel island in the pixel island group relative to the corresponding micro lens, on a plane where the pixel islands are located, so that imaging points in the imaging regions formed by at least part of different pixel islands in the pixel island groups do not overlap with each other and are arranged alternately;

determining an imaging angle range of each of the pixel islands in each of the pixel island groups, wherein each of the pixel island groups comprises a main pixel island and at least one auxiliary pixel island, a spacing between the two adjacent imaging points corresponding to the two adjacent pixels in each main pixel island is equally divided by a plurality of imaging points, one of the plurality of imaging points corresponds to one pixel in one of the at least one auxiliary pixel island, the one pixel in one of the at least one auxiliary pixel island and one pixel in the two adjacent pixels in the main pixel island are located at a same position in their respective pixel islands, and display regions corresponding to all the main pixel islands are spliced together to constitute the complete image; and determining coordinates of a position of one of the pixel island and the corresponding micro lens by taking a position of a center point of the other one of the pixel island and the corresponding micro lens as a reference point according to the imaging angle range, a distance between the pixel island and the micro lens in a first direction and a focal length of the micro lens; wherein the first direction is perpendicular to the plane where the pixel islands are located or the plane where the micro lenses are located.

2. The method according to claim 1, wherein the determining the coordinates of the position of the one comprises:
constructing a coordinate system with the reference point as a coordinate origin, wherein a coordinate axis passing through the coordinate origin in the first direction is an abscissa axis of the coordinate system, a coordinate axis passing through the coordinate origin in a second direction is an ordinate axis of the coordinate system, the second direction is parallel to a connecting line for connecting center points of two adjacent pixel island groups, and the first direction is perpendicular to the second direction; and
determining an ordinate of the position of the one in the second direction according to the imaging angle range and the distance, wherein the distance is an abscissa of the position of the one in the first direction.

3. The method according to claim 2, wherein in the condition that the distance is equal to the focal length of the micro lens, the determining the ordinate of the position of the one in the second direction comprises:
determining the ordinate by a formula:

$y1 = f \times (\tan \beta1 + \tan \beta2)/2$, wherein y1 is an ordinate of the center point of the micro lens, f is the focal length, $\beta1$ is an emergence angle of a light ray, which has passed through the micro lens, emitted from one farthest pixel in the corresponding pixel island, $\beta2$ is an emergence angle of a light ray, which has passed through the micro lens, emitted from the other farthest pixel in the corresponding pixel island, a direction linearly extending from the pixel corresponding to $\beta2$ to the pixel corresponding to $\beta1$ through the coordinate origin is the same as the second direction, and $\beta2$ is smaller than $\beta1$.

4. The method according to claim 1, wherein no gap exists between the two adjacent pixel island groups; or
a gap exists between the two adjacent pixel island groups, and the gap is filled with a transparent material.

5. The method according to claim 4, wherein each of the pixel island groups comprises a plurality of sub pixel island groups, each of the sub pixel island groups comprises three pixel islands emitting different lights, and in the three pixel islands, imaging points corresponding to pixels at the same position in the imaging regions are completely coincided.

6. The method according to claim 5, wherein the three pixel islands are arranged in an L shape, a linear shape or a delta shape.

7. The method according to claim 1, wherein the pixel islands are each in a shape of any one of a regular triangle, a square and a regular hexagon.

8. A near-to-eye display apparatus, comprising:
a plurality of pixel island groups; wherein the respective pixel island groups are provided with respective imaging regions at an imaging position, all the imaging regions are not overlapped, each of the imaging regions corresponds to a part of region of a complete image needing imaging, all the imaging regions are jointly and seamlessly spliced into the complete image, each of the pixel island groups comprises a plurality of pixel islands, and each of the pixel islands comprises a plurality of pixels arranged in an array; and
micro lenses, corresponding to the pixel islands one to one;

wherein a position of the micro lens relative to the corresponding pixel island in the pixel island group, on a plane where the micro lenses are located, or a position, of the pixel island in the pixel island group relative to the corresponding micro lens, on a plane where the pixel islands are located is adjusted so that imaging points in the imaging regions formed by at least part of different pixel islands in the pixel island groups do not overlap with each other and are arranged alternately;
each of the pixel island groups comprises a main pixel island and at least one auxiliary pixel island, a spacing between the two adjacent imaging points corresponding to the two adjacent pixels in each main pixel island is equally divided by a plurality of imaging points, one of the plurality of imaging points corresponds to one pixel in one of the at least one auxiliary pixel island, the one pixel in one of the at least one auxiliary pixel island and one pixel in the two adjacent pixels in the main pixel island are at a same position in their respective pixel islands, and display regions corresponding to all the main pixel islands are spliced together to constitute the complete image; and
coordinates of a position of one of the pixel island and the corresponding micro lens are determined by taking a position of a center point of the other one of the pixel island and the corresponding micro lens as a reference point according to an imaging angle range of the pixel island, a distance between the pixel island and the micro lens in a first direction and a focal length of the micro lens; wherein the first direction is perpendicular to the lane where the pixel islands are located or the plane where the micro lenses are located.

9. The apparatus according to claim 8, wherein:
an ordinate, of the position of the one, in a second direction is determined according to the imaging angle range and the distance, and the distance is an abscissa of the position of the one in the first direction;
wherein a coordinate axis passing through a coordinate origin in the first direction is an abscissa axis of a coordinate system with the reference point as the coordinate origin, a coordinate axis passing through the coordinate origin in a second direction is an ordinate axis of the coordinate system, the second direction is parallel to a connecting line for connecting center points of two adjacent pixel island groups, and the first direction is perpendicular to the second direction.

10. The apparatus according to claim 9, wherein in the condition that the distance is equal to the focal length of the micro lens, the ordinate of the position of the one in the second direction is determined by a formula:

$y1 = f \times (\tan \beta1 + \tan \beta2)/2$, wherein y1 is an ordinate of the center point of the micro lens, f is the focal length, $\beta1$ is an emergence angle of a light ray, which has passed through the micro lens, emitted from one farthest pixel in the corresponding pixel island, $\beta2$ is an emergence angle of a light ray, which has passed through the micro lens, emitted from the other farthest pixel in the corresponding pixel island, a direction linearly extending from the pixel corresponding to $\beta2$ to the pixel corresponding to $\beta1$ through the coordinate origin is the same as the second direction, and $\beta2$ is smaller than $\beta1$.

11. The apparatus according to claim 8, wherein no gap exists between the two adjacent pixel island groups; or a gap exists between the two adjacent pixel island groups, and the gap is filled with a transparent material.

12. The apparatus according to claim 11, wherein each of the pixel island groups comprises a plurality of sub pixel island groups, each of the sub pixel island groups comprises three pixel islands emitting different lights, and in the three pixel islands, imaging points corresponding to pixels at the same position in the imaging regions are completely coincided.

13. The apparatus according to claim 12, wherein the three pixel islands are arranged in an L shape, a linear shape or a delta shape.

14. The apparatus according to claim 8, wherein the pixel islands are each in a shape of any one of a regular triangle, a square and a regular hexagon.

15. A wearable device, comprising the near-to-eye display apparatus according to claim 8.

\* \* \* \* \*